July 29, 1969  R. D. RIEDLE ET AL  3,458,000

IMPLEMENT CONTROL APPARATUS

Filed Oct. 12, 1966  2 Sheets-Sheet 1

INVENTOR
ROBERT D. RIEDLE and
DELMAR D. RIEDLE
BY Woodard, Weikart, Emhardt & Naughton
Attorneys

United States Patent Office 3,458,000
Patented July 29, 1969

3,458,000
IMPLEMENT CONTROL APPARATUS
Robert D. Riedle, 7280 Steinmeier Drive, Indianapolis, Ind. 46250, and Delmar D. Riedle, Box 103, Vandalia, Ill. 62471
Filed Oct. 12, 1966, Ser. No. 586,175
Int. Cl. A01b 65/06, 3/46; H01f 7/06
U.S. Cl. 172—663                3 Claims

ABSTRACT OF THE DISCLOSURE

Electromagnets are provided on a farm tractor to hold the operating lever for the auxiliary valve in either of two operating conditions until the electric circuit to the magnets is broken by elevation of the hydraulic pressure to a predetermined set limit, whereupon the control lever is returned to neutral by biasing springs.

Background of the invention

This invention relates generally to electric and hydraulic control systems for machinery and vehicles and more particularly to a control system well adapted to agricultural machinery and implements.

There are many types of agricultural implements designed to be drawn by tractors and which are of substantial dimensions particularly in length and width. These include cultivators, discs, and plows. With some such equipment the front end is mounted to a hydraulically operated "three-point hitch" on the tractor whereby it can be readily raised and lowered. Because some of these implements are extremely long, or for other reasons, separate means may be provided to raise and lower the rear end of the implement independent of the front end. During use of such implements in the field and particularly when nearing the end of the field and approaching a turn, it is desirable to be able to raise the front end and then the rear end in succession so as to obtain the benefit of the entire length of the implement and yet avoid disturbance of areas which are not to be worked in the direction the implement happens to be moving at that time.

To further elaborate upon the foregoing, it may be desirable when using a seven bottom plow with a tractor to be able to get within four to eight rows of the end of the field before lifting the rear end of the plow. The front end can normally be lifted in adequate time by operating the conventional three-point hitch control of the tractor whereupon it will raise the front end of the plow without the necessity for the operator to continue holding his hand on the lever in the raised position. In other words the lever will detent in the lift position until the hitch has raised the front end of the plow and then the lever will return to neutral and the plow will be held out of the ground. The rear end will, however, remain in the soil until means are actuated to lift it.

Some tractors have auxiliary hydraulic control means whereby pressure can be applied to a hydraulic cylinder or ram on the plow which is operable to lift the rear end of the plow. Certain tractors do not have any automatic detent for the auxiliary valve control. This means that the operator must hold his hand on the control while the rear end of the plow is being raised, reduce the speed of the tractor, and turn the tractor, all within a very short time near the end of the field. It is an operation which requires three hands to be performed properly.

It is therefore an object of the present invention to provide a useful implement control apparatus.

A further object is to provide apparatus capable of quick installation and incorporation with conventional existing equipment.

A further object is to provide apparatus enabling an operator to merely move the lever momentarily to start an implement up or down and then let the lever go and have the apparatus continue to move the implement in the designated direction.

Described briefly, in a typical embodiment of the present invention, a hydraulic control lever is provided with an iron or steel block thereon and electromagnets are positioned to cooperate with the block and hold or "detent" the control in a designated position as long as necessary. Automatic return to neutral is achieved by incorporating a pressure sensitive switch in the hydraulic system and in the electrical circuit to the electromagnets. Whenever the hydraulic presure in the system is below the setting of the pressure switch, the magnets are energized so that if the operator moves the valve lever in either the up or down position the magnet will retain it in that position and hydraulic pressure will be applied as required to the implement to achieve the desired motion. When the motion reaches the limit or stop condition the pressure will rise and open the switch whereupon the lever will return to neutral.

The full nature of the invention will be understood from the accompanying drawings and the following description and claims.

Figure 1:
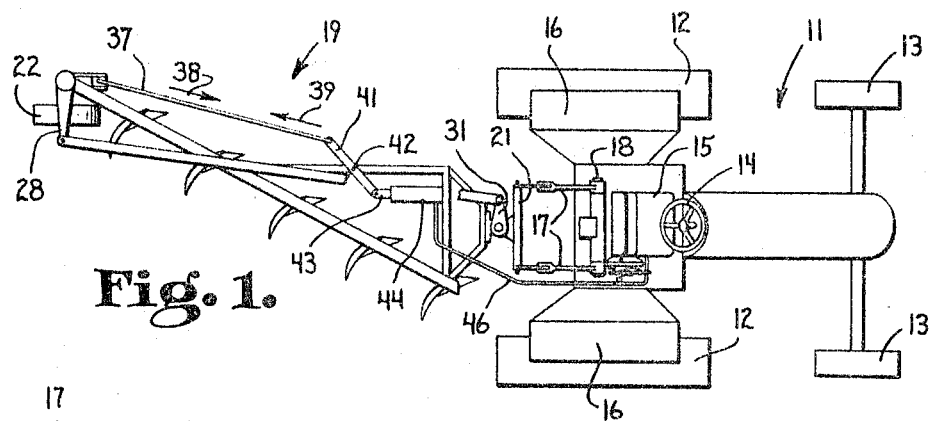
FIGURE 1 is a top plan schematic view of a tractor and implement incorporating a typical embodiment of the present invention.
Figure 3:
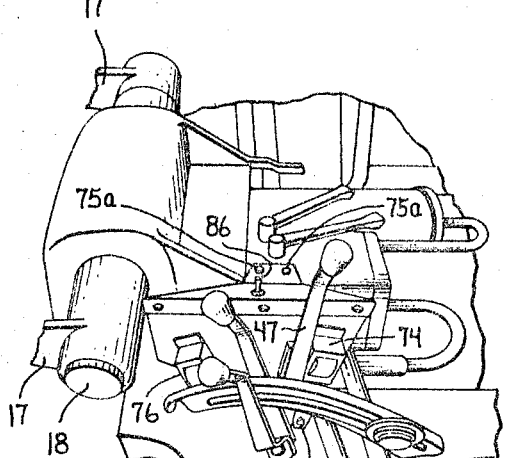
FIGURE 3 is an enlarged fragmentary perspective view of a portion of the tractor showing the control lever and electromagnets and mounting bracket for the present invention.

Referring now to the drawings in detail, the farm tractor 11 may be entirely conventional having rear wheels 12 and front wheels 13 which may be mounted in a tricycle configuration or in the wide-axle configuration shown. It has a steering wheel 14, seat 15, fenders 16 and a three-point hitch arrangement including the hydraulic lifting arms 17 mounted to a cross shaft 18 pivotally mounted to the tractor and hydraulically driven. A semi-mounted six-bottom plow 19 is connected to the tractor and while the front end is supported by the lifting arms 17 of the tractor through the hitching bar 21, the rear end is supported by a free rolling furrow wheel 22.

Figure 2:
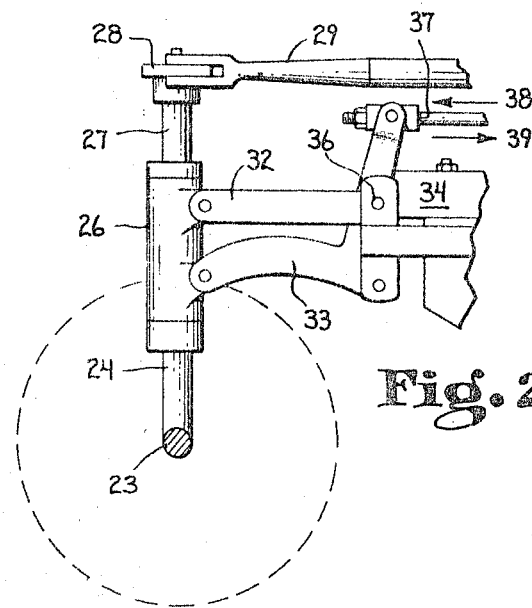
FIGURE 2 is an enlarged fragmentary side elevational view of the furrow wheel at the rear end of the plow, showing its mounting.

As best shown in FIGURE 2, the furrow wheel is mounted through suitable bearings and an axle 23 to a vertical post 24 received in support bearing assembly 26 and an upward extension 27 is provided on the post for connection through lever 28 and link 29 to a steering lever 31 connected to the hitch bar 21. In this way the furrow wheel is steered, although this is not an essential feature of the invention and it is merly for purposes of explanation. To raise and lower the rear end of the implement, the support bearing assembly 26 is mounted through the links 32 and 33 to the plow frame 34, and pivotal action is provided on a pin 36 to raise and lower the frame 34 by, respectively, pushing the bar 37 in the direction of the arrow 38 or pulling it in the direction of the arrow 39. This action of the bar 37 is obtained through the lever 41 pivotably mounted to the plow frame at 42 and pinned to a shaft 43 of a hydraulic cylinder or ram 44 (FIGURE 1). The hydraulic supply to the ram 44 can be provided by two lines 46 for driving the frame up or down at the rear end.

Figure 4:
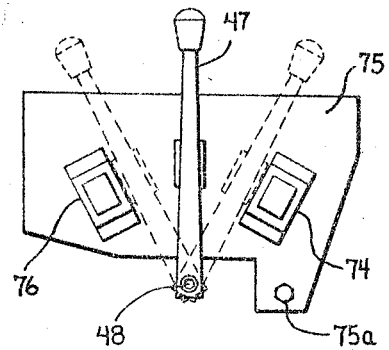
FIGURE 4 is a still further enlarged side elevational view of the manual lever and electromagnets on the bracket.
Figure 5:
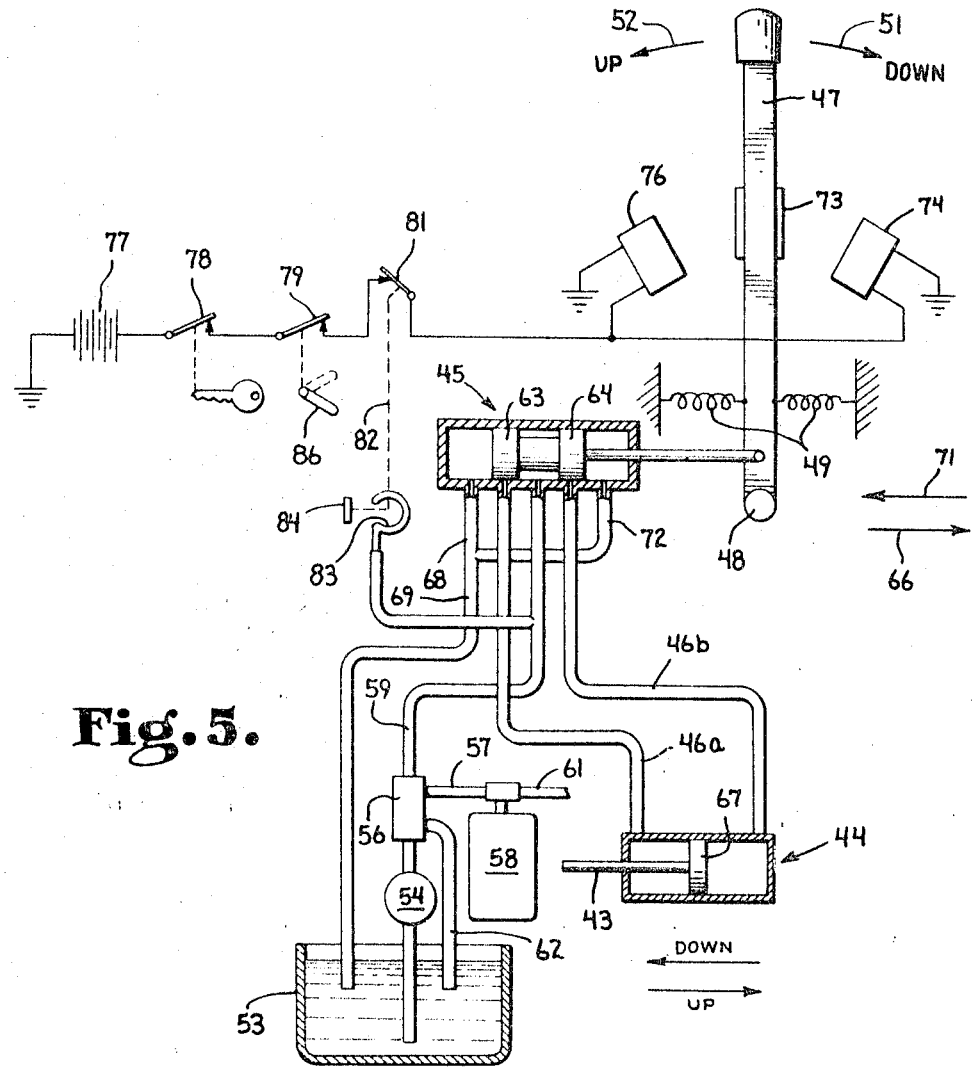
FIGURE 5 is a combination electrical and schematic diagram of a typical embodiment of the present invention.

To supply the ram according to the present invention, apparatus as shown in FIGURE 5 can be employed in one embodiment. A closed-center hydraulic system is illustrated wherein a spool valve assembly 45 is operated by the manually controllable valve lever 47, the latter being mounted to the tractor for rotation on a pivotal axis at 48. Biasing means illustrated in the form of springs 49 are provided to center the lever and therefore the valve in a neutral position as shown in FIGURES 4 and 5. To move the rear end of the plow downward the lever is moved in the direction of the arrow 51 and to move the rear end of the plow upward the lever is moved in the direction of the arrow 52.

In FIGURE 5 the illustrated hydraulic circuit includes the tractor mounted reservoir 53 with an engine driven hydraulic pump 54 applying pressure through an unloader relief valve 56 and line 57 to the accumulator 58 and line 59 to the spool valve body. The line 61 extending from the accumulator may be used to supply other hydraulic apparatus on the tractor. The unloader valve serves to by-pass part or all of the pump discharge back to the reservoir through the line 62 in the event that the pressure in lines 57 and 59 would rise to a point where the pump would be damaged or overheating would occur.

When the auxiliary valve 45 is in the neutral position as shown in FIGURE 5, the valve lands 63 and 64 block the lines 46a and 46b respectively connected to the opposite ends of the ram cylinder.

When the valve spool is moved forward in the direction of the arrow 66 by moving the lever forward to the "down" position, the valve land 64 uncovers the opening into line 46b whereupon the supply from the pump through the line 59 is applied through line 46b to the right hand end of the ram piston 67. At the same time the spool valve land 63 uncovers the port from line 46a and vents it through the valve body and return lines 68 and 69 back to the reservoir 53. This moves the lever and linkage arrangement on the plow frame to raise the furrow wheel with respect to the frame thus lowering the rear end of the plow frame and the plows therewith.

To raise the rear end of the plow, the lever handle is moved in the direction of the arrow 52 to the "up" position whereupon the spool valve is shifted so that it moves in the direction of the arrow 71. The valve land 64 thereupon moves across the port to line 46b to the left hand side thereof thus opening line 46b through the valve body and return lines 72 and 69 back to the reservoir. The other valve land moves across the port to line 46a and places it in communication with the supply line 59 from the pump whereupon pump pressure is applied to the left-hand end of the plow ram piston 67 to move the furrow wheel downward with respect to the rear end of the plow and thus raise the rear end of the plow assembly.

According to the present invention, the auxiliary valve lever is provided with means whereby it is held in either the up or down position once moved to one of these positions, until it is manually returned or until the desired motion has been completed. For this purpose, according to one embodiment a block of ferromagnetic material which may be iron or steel, for example, and which may be referred to as an armature or clapper, is used. This armature 73 is affixed to the lever 47 and electromagnets 74 and 76 are mounted to a sheet metal bracket assembly 75 which is quickly and conveniently mounted on the tractor by suitable cap screws 75a. These electromagnets are electrically energized from the tractor battery 77 through the ignition key operated switch 78 and through a toggle switch 79 and through a normally closed pressure operated switch 81. The pressure operated switch is controlled as indicated by the dotted outline 82 by a pressure responsive Bourdon tube actuator 83 connected to the high pressure line 59. This pressure switch unit can be adjusted by the screw 84 so as to open the switch 81 when the pressure in the line 59 rises to a pre-determined desired level. It is usually adjusted so that when the up or down travel accomplished by the movement of the ram piston in one direction or the other has been terminated either by a stop in the plow itself or by a stop in the ram, the resulting pressure rise in the line 59 will open the switch 81. At that time the electromagnets are de-energized.

So it is that when the toggle switch lever 86 is placed in the on position illustrated in FIGURE 5, and the tractor engine is running to drive the pump 54, whenever the auxiliary valve lever 47 is moved forward so that the armature or clapper 73 thereof is placed in contact with the electromagnet 74, it will be held in that position by the electromagnet until the downward or dropping motion of the plow has been completed and the pressure in line 59 rises to the point where the pressure operated switch 81 is opened. Then the spring centering means 49 will return the valve lever 47 and spool valve to neutral. In this condition the both ends of the ram are blocked by the valve lands and the plow will remain in the desired position indefinitely. Similarly, when the valve lever is pulled to the rear and the clapper thereof is thereby placed in contact with the electromagnet 76, the magnet will hold it in that position until the ram has driven the rear end of the plow upward to the point where a stop is reached raising the pressure in line 59 to cause the pressure switch 81 to open. In either case, as soon as the pressure switch has opened, the lever is released and the valve spool returns to neutral. The pressure in line 59 will then drop to whatever the normal operating pressure of the system happens to be as determined by the particular characteristics of the system and by the setting of the unloader valve.

It should be understood that while the electromagnets are completely adequate to hold the valve lever in either the up or down position as the tractor is operated through the field, the operator can manually overcome the force of either electromagnet to return the lever to neutral if he desires. The electromagnets may be wired in parallel as shown or may be connected in series, because both can be energized at the same time, thus adding to the simplicity of the apparatus. The present invention makes use of many readily available complements and an example of a pressure switch useful in the practice of the invention is model No. 3070 manufactured by the U.S. Gage Company.

From the foregoing description, it will be recognized that the present invention provides a conveniently installed and operated detent apparatus useful with a variety of hydraulic systems and certainly not limited to the specific plow illustrated. On certain machinery such as the Minneapolis-Moline farm and industrial tractors using the Tel-O-Flo hydraulic system, the present invention can be installed in a manner of about thirty minutes and is a completely external installation. In other words, it is not necessary to take any part of the tractor apart nor is it necessary to modify the tractor or its hydraulic system in any way in order to obtain the benefits of the present invention. It is particularly beneficial in the operation of such equipment not only as a convenience feature but as a safety feature, allowing the operator to use both hands on the steering wheel while turning in close corners. By holding the auxiliary valve lever in the maximum up or down position there is no tendency for overheating in the hydraulic system. The pressure gauge may be adjusted to operate over a considerable range of pressure and is well suited to operation in systems operating at 1025 pounds per square inch or at 1650 pounds per square inch or other pressure within or beyond this range.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. In a automotive vehicle, the combination comprising:
   a hydraulic control system;
   manual control means coupled to said system and operable in a first position placing said system in a first mode of operation and operable in a second position placing said system in a second mode of operation, and having a neutral position placing said system in a neutral condition, said manual control means having a ferromagnetic portion thereon;
   first and second electromagnetic means mounted to said vehicle, said first electromagnetic means being located proximate the location of said ferromagnetic portion when said control means are in said first position and operable when energized to hold said control means in said first position when said control means are manually moved to said second position; said second electromagnetic means being located proximate the location of said ferromagnetic portion when said control means are in said second position and operable when energized to hold said control means in said second position when said control means are manually moved to said second position;
   and switch means on said vehicle and operable in a first switched condition to energize said electromagnetic means and switchable to a second switched condition to de-energize said electromagnetic means to release said control means from whichever of said electromagnetic means is holding said control means at the time of switching from said first switched condition to said second switched condition; and
   pressure responsive means coupled to said switch means and to said control system and responsive to attainment of a predetermined level of pressure in said system to change said switch from said first switched condition to said second switched condition to de-energize said electromagnetic means and thereby to release said control means from whichever of said electromagnetic means is holding said control means.

2. The combination of claim 1 and further comprising:
   a source of hydraulic pressure in said control system;
   a source of electrical energy, said electromagnetic means being electromagnets in circuit with said energy source and said switch means,
   said control means being biased toward neutral condition,
   said control system including an auxiliary valve with a movable valve member included in said control means and positionable in a neutral position when said control means are in neutral condition,
   said vehicle being a farm tractor and said combination further comprising an implement connected to said tractor and having hydraulic ram means thereon a portion of said implement being drivable vertically by said ram means and said ram means being coupled to said auxialary valve, said ram means normally remaining static when said valve member is in neutral position and said ram means being drivable in one direction to move said implement portion upward when said control means are in said first position and said ram means being operable to permit said implement portion to move downward when said control means are in said second position.

3. The combination of claim 2 and further comprising:
   a manually operable switch in said circuit,
   a sheet metal mounting bracket mounted to the exterior of the tractor at the operator's location,
   said electromagnets being mounted on said bracket and spaced apart thereon,
   said control means including a manually operable lever with said ferromagnetic portion thereon, said lever being pivotally mounted to said tractor at the operator's location and connected to said valve member and extending through the space between said magnets and pivotable between said first position placing said ferromagnetic portion in contact with said first magnet for holding said system in said first mode of operation to drive said implement upward, and a second position placing said ferromagnetic portion in contact with said second magnet for holding said system in said second mode of operation to drive said implement downward, said lever normally returning to a neutral position between and spaced from both magnets for maintaining said implement in a stationary position.

References Cited
UNITED STATES PATENTS

| | | | |
|---|---|---|---|
| 826,225 | 7/1906 | Bullard et al. | 335—238 X |
| 1,538,950 | 5/1925 | Price | 335—186 X |
| 1,971,199 | 8/1934 | Owens | 335—170 X |
| 2,569,870 | 10/1951 | Roberts | 172—452 X |
| 2,641,664 | 6/1953 | Knutson | 335—238 X |
| 2,675,508 | 4/1954 | Ray | 335—238 |
| 2,987,050 | 6/1961 | Oppenheimer et al. | 137—625.69 X |
| 2,997,065 | 8/1961 | Johnson | 137—625.69 |
| 3,203,439 | 8/1965 | Beckett | 137—625.69 X |
| 3,329,170 | 7/1967 | Petersen | 137—625.69 |

ANTONIO F. GUIDA, Primary Examiner
ALAN E. KOPECKI, Assistant Examiner

U.S. Cl. X.R.
137—625.69; 335—219

PO-1050
(5/69)

UNITED STATES PATENT OFFICE
CERTIFICATE OF CORRECTION

Patent No. 3,458,000         Dated  July 29, 1969

Inventor(s) Robert D. Riedle and Delmar D. Riedle

It is certified that error appears in the above-identified patent and that said Letters Patent are hereby corrected as shown below:

Column 2, line 14 "presure" should read --pressure--;
line 61 "merly" should read --merely--.

Column 4, line 55, "manner" should read --matter--.

Column 5, line 20, "second" should read --first--.

Column 6, line 4, "auxialary" should read --auxiliary--.

SIGNED AND
SEALED
APR 28 1970

(SEAL)
Attest:

Edward M. Fletcher, Jr.
Attesting Officer

WILLIAM E. SCHUYLER, JR.
Commissioner of Patents